March 8, 1966  W. T. APPLEBERRY  3,238,834
QUICK RELEASE PIN

Filed July 2, 1963

INVENTOR.
WALTER T. APPLEBERRY
BY
AGENT

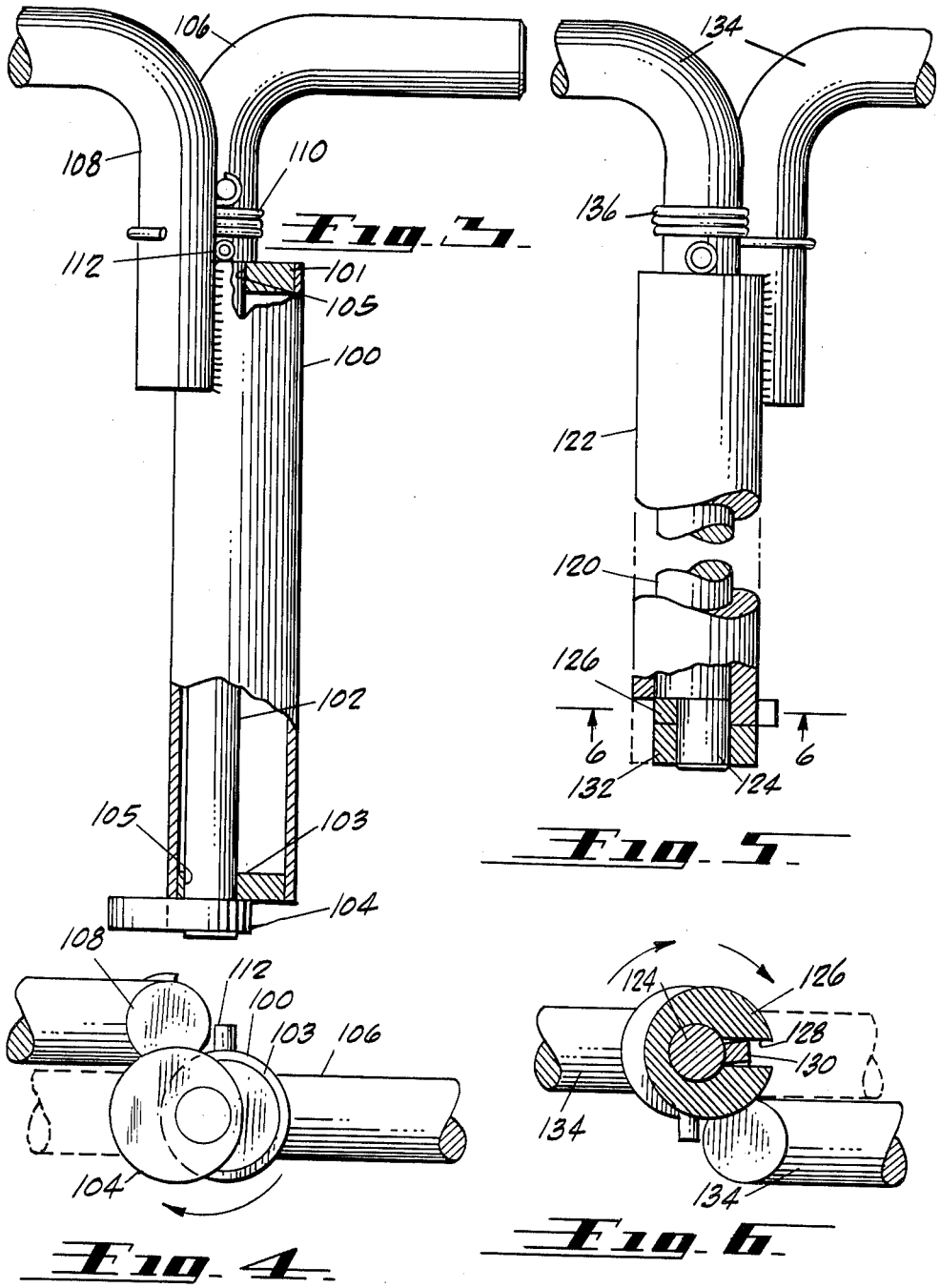

United States Patent Office 3,238,834
Patented Mar. 8, 1966

3,238,834
QUICK RELEASE PIN
Walter T. Appleberry, Palos Verdes Estates, Calif., assignor to Douglas Aircraft Company, Inc., Santa Monica, Calif.
Filed July 2, 1963, Ser. No. 292,415
2 Claims. (Cl. 85—5)

This invention relates to quick disconnect pins and especially to those types of pins which are inserted through holes in structural or other members to hold them together or to anchor them in place.

Quick release pins are often used as the fastening device for structures which are designed for rapid assembly and disassembly, and in other fastening applications. These pins are inserted, while in an unexpanded state, through holes in the parts to be assembled, or a member to be anchored, and are then expanded. The expanded pin cannot be removed because the expanded portion is larger than the hole through which it entered. Such pins are widely used, and it is desirable to provide a simple, economical and reliable pin which can perform the described functions.

One difficulty encountered with presently used pins is that they tend to jam when used under conditions wherein dirt easily enters the mechanism or ice readily forms. Many of the presently used quick disconnect pins employ projectable members for providing the expanding function, which along a line path without twisting. Dirt which enters the path of sliding is not expelled and it may accumulate and wedge between the projectable member and its guide, thereby causing jamming. Similarly ice may form which is not easily cracked and expelled by the motion of the projectable members, and jamming may result.

Perhaps one of the most important causes of jamming in presently used pins is that many employ only a spring force to retract the projectable members. If dirt or ice jams the mechanism, a person operating the pin cannot seek to loosen the pin by exerting more releasing force.

This invention provides for a simple and easily manufactured quick release pin. Furthermore, a pin is provided which is especially useful under conditions wherein dirt or ice are likely to be found which might jam an ordinary quick release pin.

The present invention provides for a simple quick release pin by utilizing a cylinder which is rotatable within a tube. Projectable members, which may be projected or withdrawn from the boundaries of the tube in locking and unlocking the pin, are generally mounted on the inner cylinder but at a point off the axis of the cylinder. As the inner cylinder is rotated, the projections are moved toward or away from the boundaries defined by the tube to lock or unlock the pin in the hole.

In one embodiment of the present invention the projectable members are pins rotatably mounted on the inner cylinder, which move in or out of a hole in the tube. The projectable pins move with a twisting motion which is likely to expel any dirt which is clogging the openings in the tube, and to easily crack any ice formed therein. Also, the openings in the tube are much larger than the cross-sectional dimensions of the projectable pins and clogging is unlikely to occur by means of the tight wedging of particles between the projectable pins and the openings in the tube.

In another embodiment of the invention, the inner cylinder or rod is rotatably mounted within and parallel to the axis of the tube, but off the center of the tube, and a projectable member is rigidly fixed to the end of the inner cylinder. As the off-center rod turns, the projectable member turns and projects outward past the boundaries of the tube.

In yet another embodiment of the invention, an inner cylinder is mounted coaxially with the tube and has an offcenter cam fixed to its end. The cam moves a projectable member past or back within the boundaries of the tube.

An important feature in all embodiments of the present invention is that both the projecting and withdrawal of the projectable member is accomplished by the direct employment of force exerted by a person operating the mechanism. If the quick release pin is difficult to operate a person can exert more force to overcome any resistance, unlike the situation encountered in the use of those quick release pins wherein a spring retracts the projecting members. Furthermore, in many embodiments of the invention the retracting of the projectable members is accomplished by squeezing two handles together, which allows for the convenient application of a large force by the person operating the device.

Accordingly, one object of the present invention is to provide a quick release pin which may be manufactured economically.

Another object of the invention is to provide a quick release pin which is resistant to jamming by dirt or ice.

A further object of the invention is to provide a quick release pin wherein an operator can apply increased force to withdraw projectable members in case of jamming.

A still further object of the present invention is to provide a quick release pin wherein large forces can be conveniently applied in releasing the pin.

These and other objects and a more complete understanding of the invention may be had from the disclosures in the following detailed specification, appended claims, and accompanying drawings, wherein:

FIG. 3 is a partially sectional side elevation view of a second embodiment of the present invention.

FIG. 4 is a bottom view of the embodiment of FIG. 3.

FIG. 5 is a partially sectional side elevation view of a third embodiment of the present invention.

FIG. 6 is a view taken on the line 6—6 of FIG. 5.

Figures 1, 2:
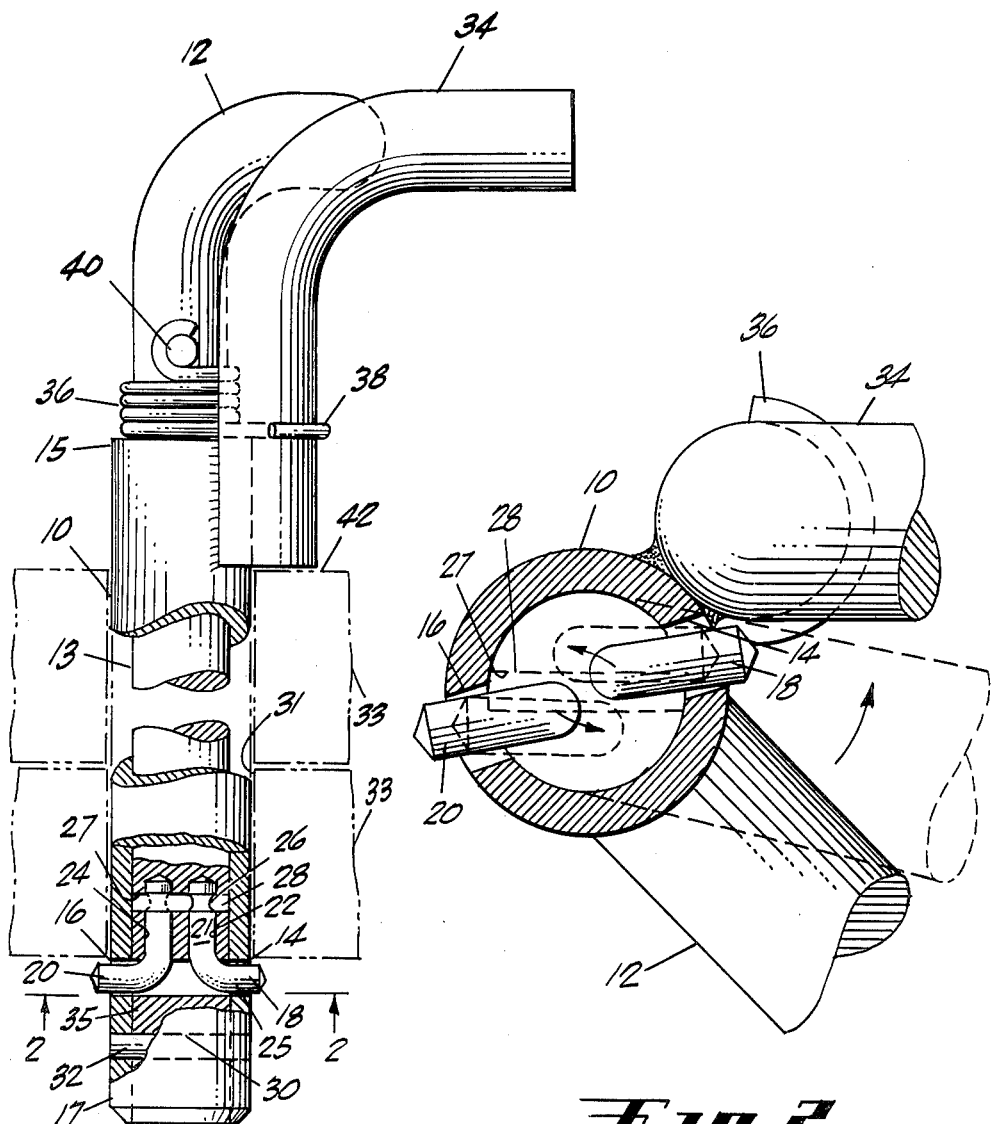
FIGURE 1 is a partially sectional side elevation view of one embodiment of the present invention shown holding two pieces of material together.
FIG. 2 is a sectional view taken on the line 2—2 of FIG. 1.

The embodiment of the invention shown in FIGS. 1 and 2 comprises a tubular member 10 having an inward end portion 17 through which is formed two radially opposite holes 14 and 16 and an outward end portion 15 to which is welded or otherwise joined a handle 34. An inner cylinder 13 fits within the tubular member 10. The inner cylinder includes a cylinder handle 12 which projects from the outer end 15 of the tubular member. Two axially extending holes 22 and 24 are formed at the innermost end of the cylinder 13, the location of each hole being spaced from the axis of the cylinder. Fitting within the holes 22 and 24 are projection pins 18 and 20. These projection pins are extended and withdrawn in the operation of the quick disconnect pin, to retain it within holes 31 in the member or members 33 through which the quick release pin extends.

Each projection pin such as pin 18 is an L-shaped element which has a bearing portion 21 fitting within the holes 22, and a projection portion 25 formed perpendicular thereto which lies within hole 14 in the tubular member 10. The bearing portion 21 of each pin has a groove 26 formed therein for enabling the retention of the projection pin within the inner cylinder 13. A retaining pin 28, wedged into a retaining hole 27 which extends radially through the entire diameter of the inner cylinder, is provided to hold the projection pins 18 and 20 within the inner cylinder. The retaining pin 28 extends partially through the holes 22 and 24. The grooves 26 of the projection pins are so situated that the retaining pin 28 engages the grooves 26 and prevents the projection pins 18 and 20 from being withdrawn from the holes 22 and 24.

The handles 12 and 34 are normally held apart at an angle of about 60° by a spring 36 which is wound around the cylinder handle 12. One end of the spring 36 forms a hook which is held by a boss 40 fastened to the cylinder handle 12. The other end of the spring forms a hook 38 which fits partially around the handle 34. If force is applied to bring the handles together, the spring 36 is put in tension and tends to spring the handles apart.

When the handles are in their spread-apart position, the projection pins 18 and 20 project out of the radial holes 14 and 16 to hold the quick release pin within the members 33. When the handles are brought together, the inner cylinder 13 is rotated so that the off-axis bearing portions 21 of the projection pins is moved away from the radial holes 14 and 16 of the tubular member 10. This causes the projection portion 25 of the projection pins to be withdrawn partially from the holes 14 and 16 and results in there being no projections extending from the quick disconnect pin to prevent its withdrawal from the hole 31. As the projection pins 18 and 20 are moved away from the radial holes 14 and 16 in the tubular member, the pins are pivoted. The holes 14 and 16 are made sufficiently large to allow for such pivoting. The thicker the walls of tubular member 10, the larger must be the holes to prevent binding.

In order to prevent dirt from entering through the inward end 17 of the tubular member 10, a plug 35 is provided which plugs the end of member 10. The plug is retained by pin 32 which is driven through a radially extending hole 30 in the tubular member 10 and plug 35.

The retaining pin described hereinbefore is especially useful under those conditions wherein dirt or other foreign matter is likely to be found which would jam an ordinary retaining pin. As mentioned hereinbefore, the retaining pins 18 and 20 do not merely move into or out of the tubular member, but move with a swiveling or pivoting action. Any sand, dirt, or other foreign particles which might clog the openings 14 and 16 are pushed out of the way by the swiveling action of the pins 18 and 20 as they move into and out of the holes 14 and 16. Any ice which might form around the holes 14 and 16 would similarly be broken and moved so that it could not interfere with the operation of the quick release pin.

It can be seen that if the projectable pins 18 and 20 should jam, large withdrawing forces can be applied to loosen the pins by squeezing the handles 12 and 34 together. The arrangement of the handles at an angle of about 60°, and the utilization of squeezing forces on the handles in the release of the pins, allows for the convenient application of large releasing forces.

One of the advantages of the quick release pin of the present invention is its simplicity and adaptability to economical and easy manufacture. The tubular member 10 is merely a tube of metal to which is joined a handle 34 at one end thereof and in which one drilling or similar operation may be performed to provide the two radial holes 14 and 16. The inner cylinder 13 is merely a rod of metal bent at one end to form a handle 12. Three holes at its other end, which are easily produced by drilling, form the axially extending holes 22 and 24 and the radially extending hole 27. A boss 40 is fastened to the handle 12 of the inner cylinder and the coil spring 36 is placed over the boss 40, wound around the inner cylinder 13 and hooked over the handle 34. Two L-shaped retaining pins 18 and 20 with grooves 26 formed therein and a retaining pin 28 complete the list of parts needed for an embodiment of the invention similar to that described above. A plug 35 may be added to protect against dirt. Each of the parts is simple to manufacture, and the entire quick release pin is easily assembled.

The assembly of the quick release pin may be accomplished by inserting the projection pins 18 and 20 into the holes 22 and 24 of the inner cylinder 13 and driving the retaining pin 28 through the retaining hole 27 of the inner cylinder. The spring 36 is then slipped over the inward end of the inner cylinder 13 and hooked over the boss 40. The inner cylinder 13 is then inserted into the tubular member 10 and the hook 38 of the spring is hooked over the outer handle 34. The relative positioning of the handle 34, holes 18 and 20, and cylinder handle 12 is such that when the handles 12 and 34 are brought together, the retaining pins 18 and 20 are sufficiently withdrawn that they do not project from the tubular member 10. The tension of the spring 36 is such that it tends to separate the handles 12 and 34 to about 60°, at which angle the retaining pins 18 and 20 project considerably from the tubular member 10. When the handles 12 and 34 are brought together so that they touch, the retaining pins 18 and 20, although not projecting out of the tubular member, lie partially within the holes 14 and 16 in the tubular member. Thus, when the inner cylinder is raised or otherwise withdrawn from the hole 31, the ends of the pins 18 and 20 abut the tubular member and raise it as the inner cylinder is raised.

In assembling the quick release pin, the handle 12 is generally rotated about 200° (before the spring 36 is hooked over it) so that the pins 18 and 20 do not project into the tubular member; after insertion, the handle 12 is rotated back to an angle of 60° and the hook 38 of the spring is placed over the handle 34.

Another embodiment of the present invention is shown in FIGS. 3 and 4. This embodiment employs a tube 100 at opposite ends of which are inserted plugs 101 and 103. The plugs are press fitted or otherwise mounted rigidly within the tube. Each plug 101 and 103 includes a bearing hole 105 having an axis parallel with the axis of the tube 100 but spaced from it. A rod 102 is rotatably mounted in the bearing holes 105 and it thus has an axis of rotation spaced from the axis of the tube 100. A projectable member 104, which is a short cylinder, is rigidly fixed to an end of the rod 102, as by a press fit. The handles 106 and 108 and a biasing spring 110 are provided, which are identical to the handles and spring of the embodiment of FIGS. 1 and 2. A pin 112 projects through the handle portion 106 of the rod 102 to prevent the further insertion of the rod within the cylinder 100.

The quick release pin is inserted through holes in workpieces to be held together, by first rotating the handles 106 and 108 together and inserting the quick release pin through the workpieces. The projectable member 104 is so positioned on the rod 102 that it does not project when the handles 106 and 108 are brought together to form a small angle therebetween. After insertion, the handles are released and tension on the spring 110 springs the handles apart. As the handles spread, the projectable member 104 pivots so that it projects past the boundaries defined by an extension of the circumference of the cylinder 100, and the quick release pin is held in place.

This embodiment of the invention has a major advantage of simplicity. It is possible to further simplify this embodiment by substituting a solid cylinder with an off-center bearing hole, in place of the tube 100 and plugs 101 and 103. However, the manufacture of cylinders with long off-center holes is generally more expensive than the manufacture and fitting together of a tube and plugs. The plugs 101 and 103 do not necessarily have a circular hole. Any shape of hole which can confine the rod 102, either by itself or by using the inner wall of the tube 100 as a bearing surface, can be used in the plugs 101 and 103. Instead of a cylindrical projecting member 104, a pin may be driven radially through the end of the rod 102; the pin would project past the boundaries of the tube 100 when the handles were spread apart.

A further embodiment of the present invention, shown in FIGS. 5 and 6, employs an inner member or rod 120 which is rotatably mounted within a thick-walled tube 122 and coaxial therewith. This embodiment employs a rod end 124 which is formed as a cylinder having an axis spaced from the axis of the rod 120. Around the rod end 124 is a projectable member 126 which is a ring with an off-center hole, through which the rod end 124 projects. A slot 128 formed in the projectable member or ring 126 engages a guide 130 formed on the end of the tube. Over the rod end is a retainer bushing 132 force fitted over the rod end and provided to hold the ring 126 in place. Handles 134 and a spring 136 are provided to rotate the rod 120 and tube 122 relative to each other; these parts function in a manner similar to that of the handles and spring of the other described embodiments.

When the handles are positioned apart at a large angle, the rod end 124 acts as a cam which forces the ring 126 to project and hold the quick release pin in place. When the handles are squeezed together, the rod end forces the ring 126 to withdraw within the boundaries defined by the circumference of the tube 122. The guide 130 which engages the slot 128 prevents the ring from rotating, and thus allows the rod end 124 to control the position of the ring 126. Although a spring is generally employed to keep the handles spread apart, it is possible to utilize friction or a latch to keep the handles spread apart and thereby maintain the pin in an expanded state.

It is usually preferable to provide for a pin that is expanded when the handles are apart and which is unexpanded when the handles are together. This is due to the fact that when the handles are together, the pin can be easily grasped with one hand and inserted or withdrawn from holes in the parts to be kept together or anchored. However, it is possible to employ quick release pins which are expanded when the handles are together and unexpanded when the handles are spread apart.

The invention, as described in connection with various embodiments thereof, is relatively economical of manufacture and simple to use. One of its most important features is the fact that the force utilized in projecting and withdrawing projectable members is derived directly from the force applied by the operator of the quick release pin, and if the pin is jammed, the operator can apply additional force to unjam it. These and various other features have been described in connection with several specific embodiments of the invention. However, many variations in the parts and their arrangements may be employed to obtain a simple and efficient quick release pin of the general type described. It is therefore desired to emphasize the fact that many further modifications may be resorted to in a manner limited only by a just interpretation of the following claims.

I claim:
1. A quick release pin comprising:
a substantially cylindrical receiving member;
an elongated cylindrical inner member having first and second opposite end portions, said inner member being coaxially and rotatably mounted within said receiving member;
said first end portion of said inner member being a cylindrically shaped cam means having an axis offset from the axis of said inner member;
a ring shaped projection member slidably mounted on said cam means and having a diameter sufficient to protrude laterally from said receiving cylinder when said inner member is rotated relative to said receiving member;
said ring-shaped projection member having a slot portion, said receiving member having a protuberance which projects into said slot portion to prevent said ring-shaped projection member from rotation relative to said receiving member;
a first handle portion mounted on said second end portion of said cylindrical inner member;
a second handle portion mounted on said receiving member and adjacent to said first handle portion;
spring means operable between said first and second handle portions, said spring means being so located that at full expansion said projection member protrudes laterally from said receiving cylinder, and at full compression said projection member does not project laterally from said receiving cylinder.
2. A quick release pin as defined in claim 1 wherein:
said cylindrical inner member rotates a predetermined angle with respect to said cylindrical receiving member;
said predetermined angle being approximately 60° in magnitude.

References Cited by the Examiner
UNITED STATES PATENTS

| | | | |
|---|---|---|---|
| 1,797,337 | 3/1931 | Freeman | 85—5 |
| 2,276,498 | 3/1942 | Lear. | |
| 2,402,925 | 4/1946 | Spooner. | |
| 2,597,857 | 5/1952 | Francis | 85—3 |
| 2,610,379 | 9/1952 | Bugg | 85—5 |
| 2,782,672 | 2/1957 | Davis. | |
| 3,145,441 | 8/1964 | Strandrud. | |

FOREIGN PATENTS

| | | |
|---|---|---|
| 788,011 | 12/1957 | Great Britain. |
| 260,448 | 9/1928 | Italy. |

EDWARD C. ALLEN, *Primary Examiner.*